Patented Feb. 10, 1948

2,435,600

UNITED STATES PATENT OFFICE 2,435,600

TREATMENT OF SATIN WHITE

Harold R. Rafton, Andover, Mass., assignor to Raffold Process Corporation, a corporation of Massachusetts No Drawing. Application March 23, 1944, Serial No. 527,837

11 Claims. (Cl. 106—306)

My invention relates to the treatment of satin white.

The principal object of my invention is the treatment of satin white to impart specific controlled and improved characteristics, and the satin white so treated.

A further object is the production of improved coated paper with said treated satin white.

Other objects and advantages of my invention will become apparent during the course of the following description.

Satin white, as is well known, may be made in a number of ways, for example by mixing a paste of slaked lime with alum in solid form, either as powder or as lumps, or more usually at the present time, by mixing a paste, slurry or milk of slaked lime with a solution of alum. High calcium lime is ordinarily used although at times lime containing magnesia has been used; and calcium carbonate has even been substituted for lime. Formerly soda, potash or ammonium alum was employed, but now ordinary alum, that is aluminum sulphate, is the alum customarily used. Sometimes Glauber's salts (i. e., sodium sulphate with water of crystallization) is used in addition to the alum. The satin white may be produced directly at the desired concentration, or brought to that concentration by subsequent treatment, for example by filtration. It is sometimes, but not usually, dried. As normally produced for sale, satin white is a paste having a solid content of approximately 30% on a dry basis (which for the purposes of this specification will be taken as based on drying at 100° C.). Occasionally, as stated, it is dried, and sold in dry form, but the dry product has not always been of satisfactory quality. When made at the point of use, satin white is sometimes produced as a thick slurry. Satin white was formerly considered to be merely a physical mixture of calcium sulphate and aluminum hydroxide, usually with a substantial percentage of slaked lime being additionally present, but more recent views lean to the opinion that it is a mixture of calcium sulphate and calcium aluminate, or even more probably that it is a calcium sulphoaluminate. It may vary in composition depending on the raw materials used, the proportions employed, and the method of manufacture. However, whatever be its composition, satin white is a well known product, sometimes produced for sale, and sometimes produced at the point of use, as at a paper or coating mill.

Satin white is used chiefly as a pigment for coating paper, wherein it is primarily used because of the high finish it imparts. It has, however, one very great disadvantage and that is its extremely high adhesive requirement, satin white ordinarily requiring from 40 to 50% or more of casein, or about 70% or more of starch (modified), based on the weight of the satin white dry basis, to give a proper adhesion on coated paper. This high adhesive requirement has been the chief reason why in recent years the use of satin white has declined rather sharply, and, so far as I know, no satin white has hitherto been produced which in paste or slurry form requires any substantially lower percentage of adhesive, such as casein or starch, than the percentages indicated above.

I have devised a process for treating satin white which overcomes to a large extent the undesirable property of high adhesive requirement, and have produced a satin white of relatively low adhesive requirement. This is accomplished without in any way detracting from the desirable qualities of the satin white, such as its quality of imparting high shine. Moreover my process tends to enhance the whiteness and brightness of the paper in which the treated satin white is used because the satin white treated by my process requires a lesser percentage of adhesive, and the presence of larger percentages of adhesive required by ordinary satin white has tended to reduce those properties. Moreover my process decreases the oil absorption of the satin white, which is an advantage, particularly in coated papers which are to be varnished. So far as I know, I am the first to produce a satin white in paste or slurry form having a relatively lower adhesive demand, for example a satin white having a casein requirement of about 25% or less, or a starch requirement of about 45% or less, on the weight of the satin white on the dry basis.

In my copending applications Serial Nos. 449,492, filed July 2, 1942, now abandoned, and 453,469, filed August 3, 1942, now abandoned, I have disclosed that by striking a pigment comprising calcium carbonate in association with water, in liquid form or in paste form respectively, with a striking surface of a rotating element having a velocity of not less than substantially 30 feet per second, I am able to modify said pigment and to impart to it highly desirable characteristics. I have found that by the application of the treatment to satin white I am able similarly to modify said satin white, to impart to it highly desirable characteristics and to produce greatly improved paper therewith.

I have described in detail in my above mentioned copending applications the equipment which I employ for carrying out my treatment and the disclosure of said applications is hereby made a part hereof for the purpose of cross reference. Briefly, my method comprises the subjecting of satin white in association with water in the form of a liquid or in the form of a paste, to the action of a striking surface of a moving element. Appreciable results are obtained when employing a velocity of not less than substantially 30 feet per second, but better results are obtained when employing higher velocities, usually not less than 100 feet per second and preferably at least 200 feet per second, or even better of 300 feet to 500 feet or more per second. I find it most convenient to use a rotating, i. e., rotor, element equipped with striking surface or surfaces, preferably a rotating element rotating at high speed. It is feasible to carry out my invention by the use of any one of a large variety of pieces of equipment, for example, by the use of a rotating element, for instance a cylinder, wheel or disc, but I prefer to use a disc because of its inherent strength at the high speeds desirable to employ. The rotating element may have as striking surface or surfaces, projections, serrations, indentations, teeth or the like on the periphery or on one or both end faces; or juts, blades, teeth or other striking surfaces may be arranged on the periphery of the rotating element, for example a disc similar to the arrangement of a steam turbine wheel, or juts, blades, teeth or other striking surfaces may be arranged on the end face or faces of the disc rather than on its periphery. The striking surfaces employed need not be an integral part of or rigidly attached to the rotating element, but may be attached as by pins, hinges or the like, and if desired, in certain cases, may swing out for example by centrifugal force. The disc referred to may be vertically disposed with its drive shaft in a horizontal plane or may be horizontally disposed with its drive shaft in a vertical plane or at any other angle desired. Because of the convenience of operation and the simplicity of the bearings required for the drive shaft of the disc, I prefer, however, to employ a disc disposed vertically, that is, with the shaft in a horizontal plane.

Although as stated, a variety of pieces of equipment will fulfill the requirements of my process, from the standpoint of economy and convenience, I prefer to use either a circular saw or a hammer mill. Of course the hammers of the hammer mill may be attached to more than one disc or the like, usually to two or more spaced on the drive shaft. The liquid or paste comprising the satin white may be subjected to the striking surfaces of the rotating element in bulk form if desired; or in jet or shaped form, either in a direction substantially opposed to that of the direction of advance of the leading faces of the striking surfaces, or otherwise, but preferably in a direction parallel to the leading faces, preferably in a plane of rotation of the rotating element from beyond the periphery thereof and directed toward its center of rotation. The leading faces of the striking surface or surfaces are preferably arranged radially in respect to the rotating element or come into that position when in operation. When using a liquid, I prefer to employ the type of machine described in my copending application Serial No. 479,373, filed March 16, 1943, allowed December 2, 1947, i. e., the so-called "Rafton mill;" and when using a paste I prefer to use a hammer mill, preferably fed from a feeding point or points in the periphery of the casing thereof, although such a feeding point or points is not essential. However, if desired, a hammer mill may be employed when using a liquid and a Rafton mill when using a paste. I may subject the satin white to only one passage through the apparatus employed, but usually improved results may be obtained by more than one passage or "pass," and thus I prefer to pass the satin white through the apparatus more than once, usually employing from five to forty passes or more.

In my copending application Serial No. 455,367, filed August 19, 1942, now abandoned, the disclosure of which is made a part hereof for purpose of cross reference, and in my copending application Serial No. 584,158, filed March 22, 1945, now abandoned, to which cross reference is also made, I have disclosed that by striking a pigment comprising calcium carbonate in association with sufficient water to form a crumbly mass, with a striking surface of a rotating element having a velocity of not less than substantially 30 feet per second, I am able to impart to said pigment characteristics similar to those imparted by the processes of my two other copending applications first mentioned herein. I have also found that by applying the said treatment of application Serial No. 455,367, or of application Serial No. 584,158, to satin white, I am able to modify said satin white similarly to the modification obtained when said satin white is treated in liquid or paste form. The amount of water required to produce a crumbly mass with satin white, starting with dry satin white, may vary with various samples, but when the resultant material contains from about 10% to about 35% of water, and conveniently about 20% to 30%, it usually exists in such condition. It will be understood that such condition exists throughout a range of water content which varies according to circumstances. With the addition of further water, the material is converted to a coherent plastic condition or paste. When starting with satin white in paste or slurry form, and drying to a point where the mass, on disintegration, yields crumbs, a somewhat larger percentage of water may sometimes be present than when starting with dry satin white and adding water thereto to form crumbs. I may carry out my invention with satin white where only enough water is present to form a crumbly solid or a solid which breaks down to crumbs on disintegration, using for the purpose the equipment previously described, and conveniently a hammer mill. However, when thus treated, the material usually dries out rather rapidly during treatment and requires the incorporation of further water to keep it in the crumbly condition, my process not being effective for modifying satin white when it is fed to a hammer mill in a dry powdery condition in bulk. The satin white in crumbly form is thus more difficult to handle, especially when multiple passes are employed, as is customarily the case. Thus the treatment of satin white with only sufficient water present to result in its being in crumbly form or disintegratable to crumbly form, although included within the scope of my invention, is my non-preferred procedure, my preferred procedures being the treatment of satin white either in a liquid or paste condition.

In the practice of my invention, I am able to change substantially the properties of satin white. For example: I can reduce the adhesive requirement from 10 to 50% or more; I can reduce the oil absorption from 10 to 30% or more; I can in some cases improve the gloss imparted thereby to coated paper, particularly where casein is employed as the adhesive; and the like.

I shall now illustrate the preferred procedures for practicing my invention.

I give the following example as illustrative of the results obtained in carrying out my process when satin white is used in association with water in the form of a thick liquid or slurry. Satin white made by the action of a solution of alum on a slurry of slaked lime, and originally in paste form but reduced to a slurry before treatment, was subjected to treatment in a Rafton mill. The satin white slurry employed had a content of satin white dry basis when the run was started of 22.9% but it became slightly more concentrated by evaporation as the run proceeded so that the slurry had a final content of satin white dry basis of 24.3%. There was additionally present an amount of modified starch equal to 4% by weight on the dry weight of the satin white present. The purpose of this modified starch was to act as a "thinning agent" to enable a slurry of a higher content of satin white to be prepared for treatment than would have been the case had only water been used to bring the satin white paste into a liquid condition. This matter will be explained in more detail later herein. The jets issuing from the nozzles of the Rafton mill into the path of the rotating element had a speed of about 86 feet per second, the pressure at the pump supplying the slurry to the nozzles being approximately 82 lbs. per square inch. The velocity of the periphery of the rotating element employed, in this case the outer ends of the teeth of a circular saw, was 472 feet per second. The run was continued for 40 passes, samples being withdrawn at the intermediate passes for test. The "starch requirement" (in this case consisting of the sum of the 4% modified starch originally present and the additional percentage of modified starch added for each individual test), and the "oil absorption," were both determined by the methods customary in the art, referred to in detail in my copending application Serial No. 449,492. The results are tabulated in Table I.

Table I

| No. of passes | Starch requirement, per cent | Per cent reduction in starch requirement, based on original as 100% | Oil absorption | Per cent reduction in oil absorption based on original as 100% |
|---|---|---|---|---|
| 0 (original sample) | 69 | | 71.5 | |
| 5 | 60 | 13 | 68.6 | 4 |
| 10 | 58 | 16 | 62.2 | 13 |
| 20 | 52 | 25 | 59.2 | 17 |
| 30 | 46 | 33 | 54.1 | 24 |
| 40 | 42 | 39 | 53.4 | 25 |

An examination of the data of Table I shows that treatment by my process has resulted in a great reduction in the adhesive requirement, in this case as shown by the reduction in the starch requirement, and in the oil absorption of the satin white.

I give the following example as illustrative of the results obtained in carrying out my process when satin white is used in association with water in the form of a paste. The satin white was made by a method similar to that by which the sample used in the preceding run was made. It was subjected to treatment in a hammer mill. The satin white paste employed had an original dry content when the run was started of 29.8%, but owing to evaporation the paste became somewhat more concentrated as the run progressed. A little water was added several times to maintain the satin white as a workable paste. The dry content of the final product, still in paste form, was 38.1%. The paste was fed into the path of the hammers through an opening in the peripheral casing of the mill by a screw conveyor arranged radially. The velocity of the periphery of the rotating element employed, in this case the outer ends of the hammers, was 349 feet per sec. The run was continued for 10 passes, samples being withdrawn after one and five passes for test. A "casein requirement" test, similar to the "starch requirement" test made on the previous samples, using casein instead of starch, was made on these samples, and, as before, an oil absorption test. The results thereof are tabulated in Table II.

Table II

| No. of passes | Casein requirement, per cent | Per cent reduction in casein requirement, based on original as 100% | Oil absorption | Per cent reduction in oil absorption based on original as 100% |
|---|---|---|---|---|
| 0 (original sample) | 40 | | 62.9 | |
| 1 | 29 | 28 | 52.2 | 17 |
| 5 | 24 | 40 | 49.1 | 22 |
| 10 | 22 | 45 | 48.3 | 23 |

An examination of the data of Table II, as of that of Table I, shows that treatment by my process has resulted in a great reduction in the adhesive requirement, in this case as shown by the reduction in the casein requirement, and in the oil absorption of the satin white.

A comparison of Tables I and II indicates that results of approximately comparable magnitudes are obtained when satin white is processed either in liquid or paste form. However, it takes more passes to achieve the results in the liquid form, at least in the examples illustrated above. This is doubtless due to the fact that the satin white was present in a lower concentration in the liquid form than it was in the paste form, and the effectiveness of the treatment increases rapidly with increasing concentration. However, the efficiency of a Rafton mill (used in the run of Table I) in respect to power consumption is usually better than that of a hammer mill (used in the run of Table II), and thus the treatment in liquid form is not at the disadvantage which would be indicated by the greater number of passes required. Moreover, it is much easier to handle a liquid than a paste, and in many cases the over-all efficiency is found to be greater when treatment is carried out in liquid form. Thus the choice between treating in liquid or in paste form may well be determined by the condition in which the satin white originally exists, or in which it is desired to produce it for use. However, if the satin white is made to be marketed, and not for use directly at its point of manufacture, and if it is produced in paste form and is to be shipped in paste form, the treatment in the hammer mill in such case presents certain advantages, chiefly in that it is unnecessary to liquefy the paste initially for treatment, and in that the evaporation which takes place during the processing produces a satin white paste of a higher dry content, which makes for economy in shipment. The processing action, moreover, produces a paste of higher dry content for a given consistency, so that the higher dry content treated product is not unduly stiff and difficult to incorporate in a coating mix.

While the satin white may be processed in the slurry form with water alone acting to thin the paste, this is not as efficient as when employing a thinning agent. The matter of thinning agents has been referred to in my copending application Serial No. 449,492; and as stated previously herein, a thinning agent was used in the run, the results of which are tabulated in Table I. The method of using a thinning agent consists in adding a small percentage of some material to the satin white in paste form, which acts to liquefy it. The efficiency of using a thinning agent lies in the fact that by its use a slurry of higher dry content may be obtained than if water is employed to liquefy the satin white. The treating equipment has a more effective action upon such a slurry than it has upon a slurry of lower dry content. Thinning agents may also be used to soften a stiff paste of relatively high dry content to make it easier to handle. Modified starch, which is particularly effective as a thinning agent with calcium carbonate, is also effective with satin white. Casein solution, likewise effective with calcium carbonate, is moderately effective with satin white, but tends to thicken with time; however addition of alkali lessens the tendency somewhat. Tetrasodium pyrophosphate is only moderately effective. Gum arabic is effective. Polymerized sodium salts of alkyl naphthalene sulphonic acids (alkyl long chain) known by the trade name of "Daxad No. 11" is very effective, as is also "calgon" (sodium hexametaphosphate). 1 or 2% of either of the latter agents, usually about 2%, liquefies a satin white paste, so that even at a relatively high dry concentration the paste may be reduced to liquid form. The other thinning agents require usually 3 to 4% or thereabouts.

My treatment is effective to modify the properties of satin white either by itself or if it be mixed with other material, e. g., other pigment; or if it be of a composition somewhat different from usual. Satin white is sometimes made in admixture with other materials and of somewhat different composition; for example sometimes a soluble phosphate like sodium phosphate is incorporated during its manufacture leading to the presence of insoluble phosphate in the product, sometimes sulphur dioxide or a soluble sulphite or bi-sulphite is used leading to the presence of an insoluble sulphite in the product; but these or other products made from lime and alum, with or without such or similar admixtures, may be classified generically as satin white and they, as well as the customary satin white, are included within the scope of my invention.

The satin white treated by my process may be utilized in coating mixes in the manner customary in the art, as the only pigment, or in connection with other coating pigment or pigments, with the proper amount of adhesive, and any other ingredients employed, and applied to either one or both sides of a paper web either on an ordinary coating machine, or on the paper machine. The coated paper so produced, in comparison with coated paper similarly produced from a similar grade of satin white, but untreated by my process, may be made with a lesser percentage of adhesive, is less absorbent of oil base inks, in some cases has a better finish, is whiter and brighter owing to the lesser adhesive required if the adhesive be one which has a tendency to lower the brightness and whiteness of the paper with increase in percentage used, and in general is of greatly improved quality and characteristics.

In the illustrative runs in Tables I and II, I have shown a reduction in the starch and casein requirements of satin white treated by my process. Casein is ordinarily the adhesive most widely used in coated paper, but starch is also widely used. Similar percentage reduction in adhesive requirement of satin white treated by my process may be obtained with other adhesives employed in the coating industry, such as glue, gums, or protein, proteinaceous, protein-like or protein-containing adhesive derived from other sources such as soya bean, corn (zein), or the like, casein in modified form, as well as other materials useful as adhesives in coated paper.

The satin white after treatment by my process may be used directly, or it may be diluted, concentrated or dried prior to use.

My process has little or no effect on the particle size of the satin white which is subjected thereto, as determined by microscopic observation.

My process is not only applicable to satin white in the liquid, paste, or crumbly condition in the wet form in which it is produced, or by removing some water therefrom but without drying the satin white, but, as has already been indicated in connection with the adaptation employing satin white in crumbly condition, it is also applicable to satin white which has been prepared in wet form and then dried, that is to say, the dried pigment may be wet up to form a liquid, paste or crumbly mass and then treated in my process.

As explained in detail in connection with my copending applications Serial Nos. 449,492, 453,469 and 455,367, my treatment may be conducted as a batch process or as a continuous process. Reference is made to those applications for information as to appropriate equipment in which either the batch or the continuous operation may be conducted. Inasmuch as a substantial proportion of the energy employed in my process is converted into heat, it is appropriate to take this into consideration in operating the process. Sometimes this may be made use of as by producing a more concentrated slurry, paste or crumbly mass because of the evaporation involved. At other times it may be desirable to provide cooling devices, preferably water jackets and the like. Of course, if for any reason it be desired, additional heat may be supplied. Also water may be added to compensate for evaporation. If desired, my process may be carried out at superatmospheric or subatmospheric pressure, instead of at substantially atmospheric pressure. The latter, however, is my preferred practice.

Where I use in my process a liquid or paste comprising water and satin white, a thinning agent, antifoam agent, other pigment or the like may be included; and if the satin white after treatment in my process is to be used as pigment for coating paper, any other ingredient used in a coating mix may be present with the satin white during treatment by my process. Moreover a coating mix, as such, containing the desired amount of adhesive and the satin white may be treated in my process, but although this is satisfactory in some cases, usually it is not as efficient, because the concentration of the satin white is generally smaller in such mixes than the concentrations at which it may be more efficiently treated. Where I use in my process satin white containing sufficient water so that it exists as a crumbly solid, I may have other material present therewith, if desired, providing the crumbly condition of the satin white is not substantially altered thereby.

It occasionally happens when using satin white in its original condition as well as treated satin white, that the adhesive requirement is higher than anticipated, chiefly when casein or other protein or protein-like adhesive is employed. This is sometimes the case when the satin white is employed as only a minor constituent of a coating formula, and also frequently when the casein is added in undissolved form to the coating pigment or pigments and dissolved directly in contact therewith. I have found a method of preventing this difficulty, or of correcting it if it has already occurred, and that is by the use of a material capable of yielding hydroxyl ions. Any soluble or reasonably soluble metallic hydroxide, as sodium hydroxide, potassium hydroxide or calcium hydroxide may be used, but from the standpoint of economy and convenience I prefer to use sodium hydroxide. Only a small amount is required: 1% based on the dry weight of the pigment present, and usually much less, is effective. More of course may be used, but too much is undesirable as it may have a yellowing and/or weakening effect on the paper on drying. I may use the sodium hydroxide as a solvent for the adhesive such as casein, providing an excess is employed over that required for the solvent action, or I may add it directly to the mix at any time during or after the preparation of the mix and before its use. By the employment of sodium hydroxide, the coating mix containing satin white, which otherwise might be found to produce a weak coating on paper, is found to produce a strong coating. Frequently such treatment will raise the strength of a coating some two to three waxes or more in the Dennison series over what the strength of the coating would be if made from the same coating mix, but in the absence of the sodium hydroxide.

I have not as yet determined the cause of the outstanding modification of the properties of satin white brought about by its subjection to my process, but my theory is that it is due to some change which takes place in the surface characteristics of the individual particles. It may be that the physical, chemical, electrical or other condition of the satin white particles has been altered. My process is in no sense a grinding process per se, and if there should be, by chance, any comminution in particle size, it is purely incidental and does not account for the modification in properties brought about in my process. Indeed, as to adhesive requirement and oil absorption, any decrease in particle size of a pigment is ordinarily accompanied by an increase in those properties, rather than a decrease.

It is, of course, well known to comminute materials or break down aggregates therein by treatment in hammer mills or the like, but as stated, this is not the process which I employ. Furthermore such comminution operations for the most part take place on dry material; and, so far as I know, satin white has never been treated in the prior art in a hammer mill to change its properties, such as adhesive requirement and the like, nor has anyone ever observed that any such modification of properties could take place by treating satin white in the manner I treat it, prior to my invention thereof.

While I have described the use of my treated satin white in coated paper, it is also to be understood that it may be employed to advantage in any other use to which satin white may be put, for example in cold water paints, or in other paints, enamels or coatings, or as a filler in rubber, rubber-like materials, plastics, putties or other articles of manufacture.

It is to be understood that my invention is not limited in any way by any theory expressed herein, or by its validity or invalidity, because regardless of any theory, the results are as stated herein.

Cross reference is also made to my copending application Serial No. 504,921, filed October 4, 1943, which relates to subjecting calcium sulphite to a process similar to that disclosed herein.

While I have described in detail the preferred embodiments of my invention, it is to be understood that the details of procedure, the proportion of ingredients, the arrangement of steps, and the mechanical devices used, are presented for purposes of illustration only, and may be widely varied without departing from the spirit of my invention or the scope of the subjoined claims.

I claim:

1. In the treatment of satin white, the method of modifying said satin white to effect a reduction in at least one of the properties of adhesive requirement and oil absorption of said satin white, which comprises the step of subjecting a mixture comprising said satin white and water to a blow from a striking member of a rotor element, the subjection to said blow having substantially no effect on the particle size of said satin white, said mixture being free to move upon, and at the point of, the striking of said blow, said rotor element at the time of subjecting said mixture to the striking of said blow being substantially free from contact with said mixture except in respect to said striking member, said mixture being propelled by said striking member away from and out of the path of said striking member, said water being present in said mixture in an amount not less than substantially 10% by weight, and said striking member having a velocity of not less than substantially 30 feet per second at the point of the striking of said blow.

2. The method of modifying satin white, which comprises subjecting a mixture comprising said satin white and water to blows from the striking members of a rotor element, the subjection to said blows having substantially no effect on the particle size of said satin white, said mixture being free to move upon, and at the points of, the striking of said blows, said rotor element at the time of subjecting said mixture to the striking of said blows being substantially free from contact with said mixture except in respect to said striking members, said mixture being propelled by said striking members away from and out of the path of said striking members, said water being present in said mixture in an amount not less than substantially 10% by weight but insufficient to convert said mixture into a paste, said striking members having a velocity of not less than substantially 30 feet per second at the points of the striking of said blows, until a reduction is effected in at least one of the properties of adhesive requirement and oil absorption of said satin white of not less than one-tenth of the original value of said property.

3. The method of modifying satin white, which comprises subjecting a paste comprising said satin white and water to blows from the striking members of a rotor element, the subjection to said blows having substantially no effect on the particle size of said satin white, said paste being free to move upon, and at the points of, the striking of said blows, said rotor element at the time of subjecting said paste to the striking of said blows being substantially free from contact with said paste except in respect to said striking members, said paste being propelled by said striking members away from and out of the path of said striking members, said striking members having a velocity of not less than substantially 30 feet per second at the points of the striking of said blows, until a reduction is effected in at least one of the properties of adhesive requirement and oil absorption of said satin white of not less than one tenth of the original value of said property.

4. The method of modifying satin white, which comprises subjecting a slurry comprising said satin white and water to blows from the striking members of a rotor element, the subjection to said blows having substantially no effect on the particle size of said satin white, said slurry being free to move upon, and at the points of, the striking of said blows, said rotor element at the time of subjecting said slurry to the striking of said blows being substantially free from contact with said slurry except in respect to said striking members, said slurry being propelled by said striking members away from and out of the path of said striking members, said striking members having a velocity of not less than substantially 30 feet per second at the points of the striking of said blows, until a reduction is effected in at least one of the properties of adhesive requirement and oil absorption of said satin white of not less than one-tenth of the original value of said property.

5. A method according to claim 4 in which the slurry comprising said satin white and water contains a thinning agent.

6. The method of modifying satin white, which comprises subjecting a paste comprising said satin white and water to blows from the hammers of a rotor element, the subjection to said blows having substantially no effect on the particle size of said satin white, said paste being free to move upon, and at the points of, the striking of said blows, said rotor element at the time of subjecting said paste to the striking of said blows being substantially free from contact with said paste except in respect to said hammers, said paste being propelled by said hammers away from and out of the path of said hammers, said hammers having a velocity of not less than substantially 100 feet per second at the points of the striking of said blows, until a reduction is effected in at least one of the properties of adhesive requirement and oil absorption of said satin white of not less than one-tenth of the original value of said property.

7. The method of modifying satin white, which comprises subjecting a paste comprising said satin white and water to blows from the teeth of a circular saw, the subjection to said blows having substantially no effect on the particle size of said satin white, said paste being free to move upon, and at the points of, the striking of said blows, said circular saw at the time of subjecting said paste to the striking of said blows being substantially free from contact with said paste except in respect to said teeth, said paste being propelled by said teeth away from and out of the path of said teeth, said teeth having a velocity of not less than substantially 100 feet per second at the points of the striking of said blows, until a reduction is effected in at least one of the properties of adhesive requirement and oil absorption of said satin white of not less than one tenth of the original value of said property.

8. The method of modifying satin white, which comprises subjecting a slurry comprising said satin white and water to blows from the hammers of a rotor element, the subjection to said blows having substantially no effect on the particle size of said satin white, said slurry being free to move upon, and at the points of, the striking of said blows, said rotor element at the time of subjecting said slurry to the striking of said blows being substantially free from contact with said slurry except in respect to said hammers, said slurry being propelled by said hammers away from and out of the path of said hammers, said hammers having a velocity of not less than substantially 100 feet per second at the points of the striking of said blows, until a reduction is effected in at least one of the properties of adhesive requirement and oil absorption of said satin white of not less than one tenth of the original value of said property.

9. The method of modifying satin white, which comprises subjecting a slurry comprising said satin white and water to blows from the teeth of a circular saw, the subjection to said blows having substantially no effect on the particle size of said satin white, said slurry being free to move upon, and at the points of, the striking of said blows, said circular saw at the time of subjecting said slurry to the striking of said blows being substantially free from contact with said slurry except in respect to said teeth, said slurry being propelled by said teeth away from and out of the path of said teeth, said teeth having a velocity of not less than substantially 100 feet per second at the points of the striking of said blows, until a reduction is effected in at least one of the properties of adhesive requirement and oil absorption of said satin white of not less than one tenth of the original value of said property.

10. The method of modifying satin white, which comprises subjecting a slurry comprising said satin white and water to blows from the striking members of a rotor element, the subjection to said blows having substantially no effect on the particle size of said satin white, said slurry constituting at least one jet, the slurry of said jet being free to move upon, and at the point of, the striking of each such blow, said rotor element at the time of subjecting said jet to the striking of said blows being substantially free from contact with said slurry except in respect to said striking members, said slurry being propelled by said striking members away from and out of the path of said striking members, said striking members having a velocity of not less than substantially 100 feet per second at the point of the striking of each such blow, until a reduction is effected in at least one of the properties of adhesive requirement and oil absorption of said satin white of not less than one tenth of the original value of said property.

11. The method of modifying satin white, which comprises subjecting a slurry comprising said satin white and water to blows from the teeth of a circular saw, the subjection to said blows having substantially no effect on the particle size of said satin white, said slurry constituting at least one jet, the slurry of said jet being free to move upon, and at the point of, the striking of each such blow, said circular saw at the time of subjecting said jet to the striking of said blows being substantially free from contact with said slurry except in respect to said teeth, said slurry being propelled by said teeth away from and out of the path of said teeth, said teeth having a velocity of not less than substantially 300 feet per second at the point of the striking of each such blow, until a reduction is effected in at least one of the properties of adhesive requirement and oil absorption of said satin white of not less than one tenth of the original value of said property.

HAROLD R. RAFTON.

REFERENCES CITED

The following references are of record in the file of this patent:

UNITED STATES PATENTS

| Number | Name | Date |
|---|---|---|
| 2,310,693 | Haywood | Feb. 9, 1943 |
| 2,231,902 | Offutt | Feb. 18, 1941 |
| 2,210,835 | Jones | Aug. 6, 1940 |
| 1,470,765 | Ryan | Oct. 16, 1923 |
| 2,345,311 | Wilson | Mar. 28, 1944 |
| 1,764,020 | Hopkins | June 17, 1930 |
| 2,323,877 | Turbett | July 6, 1943 |
| 1,523,632 | China | Jan. 20, 1925 |
| 2,148,448 | Edwards | Feb. 28, 1939 |